Feb. 13, 1962  L. LEVIN  3,021,173
GLARE REDUCER FOR ONCOMING HEADLIGHTS
Filed March 7, 1960  2 Sheets-Sheet 1
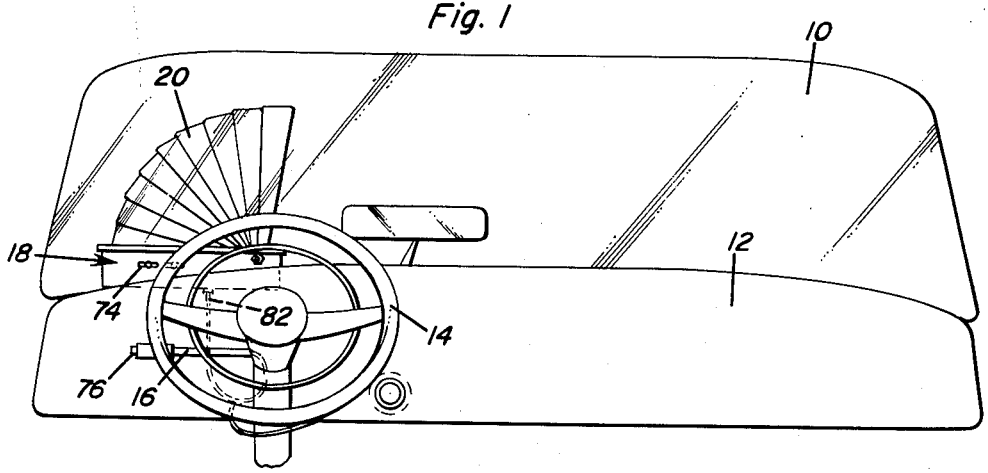
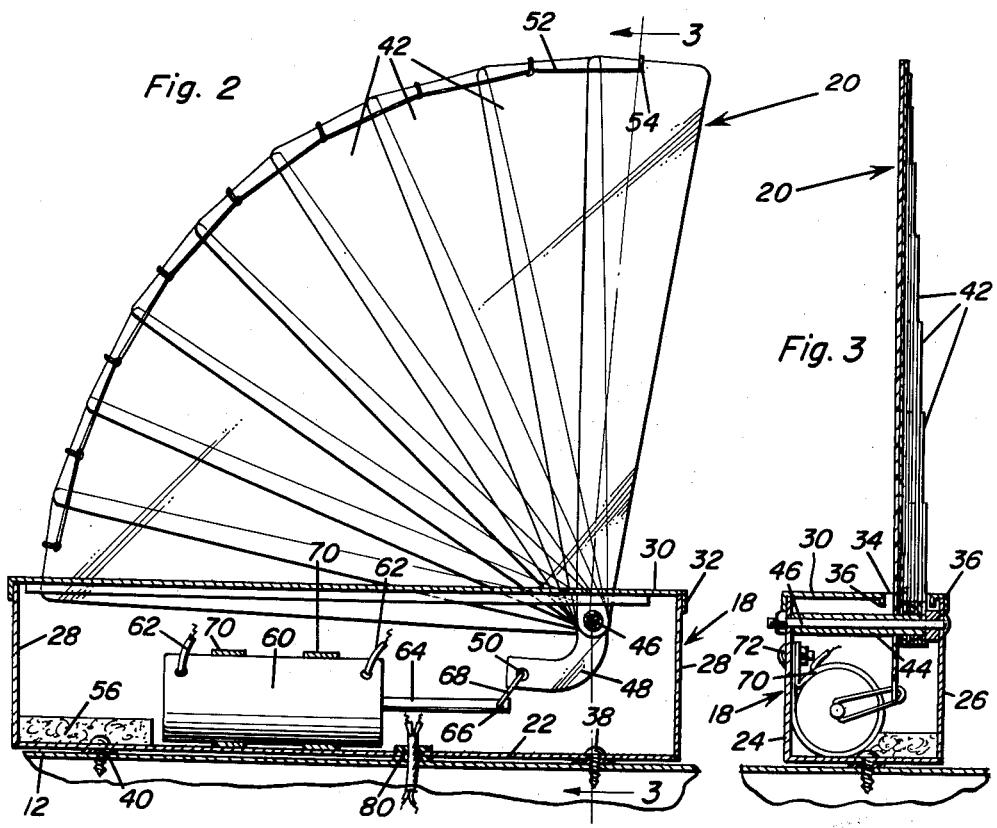
Leon Levin, INVENTOR.
BY *Clarence A. O'Brien*
and *Harvey B. Jacobson*
Attorneys Feb. 13, 1962 L. LEVIN 3,021,173
GLARE REDUCER FOR ONCOMING HEADLIGHTS
Filed March 7, 1960 2 Sheets-Sheet 2
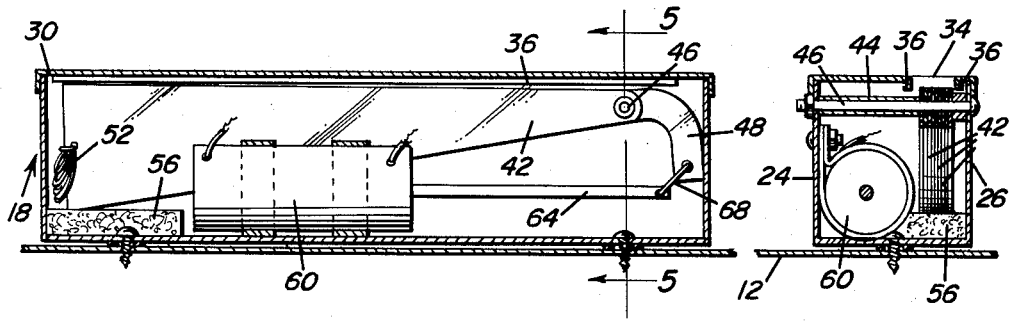
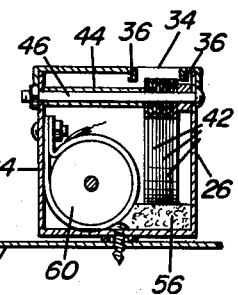
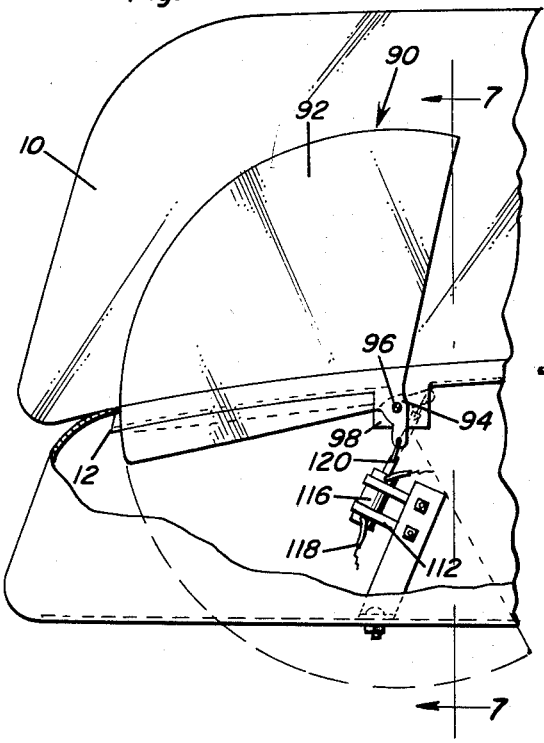
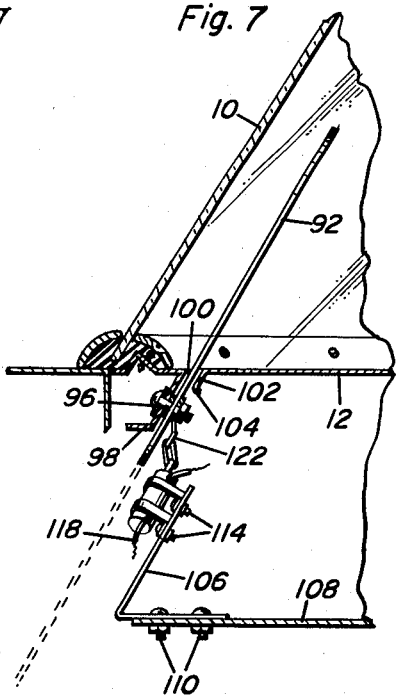
Leon Levin
INVENTOR.

United States Patent Office 3,021,173
Patented Feb. 13, 1962

3,021,173
GLARE REDUCER FOR ONCOMING
HEADLIGHTS
Leon Levin, 50 E. Sunbury St., Shamokin, Pa.
Filed Mar. 7, 1960, Ser. No. 13,118
5 Claims. (Cl. 296—97)

This invention comprises a novel and useful glare reducer for oncoming headlights and more particularly relates to an attachment for use with the windshields of automotive vehicles as a safety device to shield the driver from the glare of oncoming headlights and thereby contribute towards safer driving.

The principal object of this invention is to provide a glare reducing shield which is particularly adapted for mounting in an improved and advantageous manner adjacent the windshield of a motor vehicle and which shall be capable of being instantaneously brought into an operative position at a moment's notice in order to shield the eyes of the driver of the vehicle from glare arising from oncoming headlights; and which shall be quickly returned into a retracted, stored, non-operative position after the necessity for the glare shield has passed in order to permit the driver to have normal vision through his windshield.

A further object of the invention is to provide an attachment for motor vehicles in accordance with the preceding objects which shall be capable of being easily and quickly installed upon existing automobiles in order to provide thereby the services and the advantages of this invention.

A still further object of the invention is to provide a device in accordance with the foregoing objects in which all of the operative parts of the device shall be compactly housed and contained in a relatively small unobstrusive container or housing.

Another object of the invention is to provide a glare reducing safety device for automobiles in which the principles of the invention may be readily adapted and advantageously applied to constructions intended to function primarily as an attachment for existing automobile constructions or to function as a device which may be readily built into the original construction of automobiles.

Yet another object of the invention is to provide a device in accordance with the foregoing objects in which the glare reducing shield shall be so constructed and mounted as to be interposed over only a relatively small portion of the windshield area of a vehicle in proper position to shield the eyes of the driver of the vehicle from the glare of oncoming headlights; and whereby the area or extent of the shielding action of the device may be readily varied and adjusted as required by the particular needs of different drivers.

Still another object of the invention is to provide a glare reducing safety device of the character recited in the preceding objects which shall consist of a plurality of translucent segments pivoted upon a common pivot for movement between a compactly lowered and stored condition of the segments when not in use to a fan-shaped elevated or spread position of the segments when their services are required; together with means connecting the outer edge portions of the segments together in such a manner as to selectively extend and elevate the segments into their spread and operative positions, and yet will enable adjustment of the relative areas covered by the individual segments during this spreading operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in elevation illustrating a part of the dash, windshield, and steering wheel of an automotive vehicle and illustrating the manner in which a preferred embodiment of this invention is applied thereto, the glare reducing shield being shown in its elevated, spread or operative position;

FIGURE 2 is a view taken upon an enlarged scale of the glare reducing device of FIGURE 1 and showing in vertical longitudinal section the housing of the device and showing in elevation the segments of the shield in the spread or extended position thereof;

FIGURE 3 is a view in vertical transverse section taken substantially upon the plane indicated by the section line 3—3 of FIGURE 2 and showing further details of the arrangement of the operating mechanism of the device;

FIGURE 4 is a view similar to FIGURE 2 but showing the device in its collapsed or retracted position of the segments thereof;

FIGURE 5 is a view in vertical transverse section taken substantially upon the plane indicated by the section line 5—5 of FIGURE 4 and showing the position of the mechanism in the retracted position of the device;

FIGURE 6 is a fragmentary elevational view similar to FIGURE 1 but with a portion of the dash broken away and showing a modified construction of the device particularly adapted to be built into the factory construction of a vehicle; and FIGURE 7 is a view in vertical transverse section taken substantially upon the plane indicated by the section line 7—7 of FIGURE 1 and showing further details of the construction and mounting of the device of FIGURE 6.

In both of the embodiments of FIGURES 1–5 and FIGURES 6 and 7 there is embodied the common basic principle of this invention, namely, the provision of a translucent glare protective shield in the form of a screen which is so mounted that it may be moved from a lowered unobstrusive retracted position to an elevated, extended or operative position whereby it will shield the eyes of the driver of a vehicle from the glare of oncoming headlights; and whereby the normally retracted filter or screen is capable of being very rapidly or substantially instantaneously lifted from its retracted position to its fully operative position in order to afford emergency protection for the driver against the effects of glare.

Considering first the embodiment of FIGURES 1–5 which is generally preferred as being more readily attached to and mounted upon existing constructions of automotive vehicles, it will be observed that numeral 10 designates generally a portion of a windshield of the vehicle which vehicle also has a dash 12 together with a steering wheel 14 having associated therewith the usual turn signal indicator lever 16. The glare reducing device of this invention shown operatively mounted upon this conventional structure of this type of motor vehicle consists of a casing or housing 18 which carries the movable glare shield or filter 20.

Referring now especially to FIGURES 2 and 3 it will be seen that the housing 18 is constructed of any suitable preferably light weight inexpensive material such as sheet metal, a suitable plastic or the like and is in the form of a cabinet or box provided with a bottom wall 22, side walls 24 and 26 together with end walls 28. There is also provided a removable top wall 30 constituting a removable closure or cover for the casing or housing 18 and which is preferably provided with marginal or peripherally extending downturned flanges 32 by which the top wall is positioned upon the open upper end of the box-like housing. The top wall is further provided with a longitudinally extending opening or slot 34 along the marginal sides of which are downwardly projected inwardly and outwardly turned guide lips or flanges as at 36. The segmental fan-like glare shield 20 is projectible from the interior of the box through the slot 34 from the position shown in FIGURE 4 to the position shown in FIGURE 2, the downturned flanges or lips 36 constituting guide elements which facilitate the upward projection of the segments of the fan through the slot from the interior of the box to the extended position of the glare shield.

The device may be removably mounted upon the dash 12 of the vehicle as by means of self-threading metal screws 38 provided with spacer washers 40 between the top of the dash and the bottom wall 22 of the housing, as illustrated in the drawings.

The glare shield 20 in the embodiment of FIGURES 1–5 which is preferred as an attachment for existing automobile structures, is fan-like in nature consisting of a plurality of individual blades, vanes or segments, each designated by the numeral 42. At their narrower ends each of the segments is apertured and is freely rotatably journaled upon a bushing sleeve 44, see FIGURE 3, which, in turn, is carried by a bolt 46 constituting a pivot and which extends through the opposite side walls 24 and 26 and if desired through the downturned rim flanges 32 of the cover 30 and thus serves both to provide a pivot for the vertically swinging segments 42 as well as a retaining means to secure the cover to the compartment.

An end one of the segments 42 is provided with an integral downwardly projecting arm 48 which is apertured as at 50 for connection to an operating means to be hereinafter described.

Connecting means are provided between the individual segments or vanes of the glare shield to operatively connect them together for successive lifting as the end segment is pivoted about its pivot pin 46. This connecting means preferably consists of a flexible member 52 such as a suitable cable, cord or the like and which is secured to the individual segments by being threaded through apertures 54 therein adjacent the outermost periphery of these segments. It will be evident that by properly adjusting the position of that section of the flexible connecting means 52 which extends between adjacent apertures 54 of adjacent segments 42, that the extent of the spreading of the segments with respect to each other can be readily adjusted to thus vary and control the amount of overlap of the edges of the segments with respect to each other and thus the entire total area which is covered by the glare shield when the latter is in its raised position as shown in FIGURES 1 and 2.

As so far described, it will now be understood from a consideration of FIGURE 4 in conjunction with FIGURE 2 that in the collapsed position of the glare shield all of the segments are disposed in side by side relation collapsed or housed within the casing or housing 18 and below the top wall 30 thereof which thus constitutes a protective covering which prevents the ingress of foreign matter into the mechanism of the device. In this lowered position, the ends of the segments which are remote from their pivot pin 46 rest upon a cushioning pad 56 of sponge rubber or other suitable material, as suggested in FIGURE 4, which thereby cushions or deadens the sound of the segments as they are collapsed under the influence of gravity into their stored position. When a clockwise rotation is imparted to the arm 48 by the operating means to be hereinafter described, and as viewed in FIGURE 4, it will be observed that the endmost section to which the arm 48 is integrally connected will be lifted through the guide flanges 36 of the slot 34 in the cover 30 and after the slack is taken up in the adjacent associated portion of the flexible connecting means 52, the next succeeding section will, in turn, be lifted and so on until all of the sections are drawn into the elevated position shown in FIGURE 2. It will be observed that in this position the center of gravity of the entire fan will lie considerably to the left of a vertical axis through the pivot pin 46 so that when the operating force is released, gravity will in turn cause the sections to drop into their collapsed position, the flexible tape 52 pulling any sections which are past the vertical line through the center of gravity downwardly with the other sections.

At this point it is important to note as shown in FIGURE 1 that the glare shield 20 is so positioned on the vehicle as to occupy only a relatively small portion of the windshield thereof and is so positioned thereon as to enable it to be effectively interposed in the line of sight of the driver of the vehicle to shield him from the glare of oncoming vehicles. The device is so adjusted that the endmost or operating segment of the shield will in its operative position be positioned slightly beyond a vertical line through the pivot axis of the device and slightly to the right of the driver's portion of the center of the windshield. Obviously, the position of the housing 18 will be adjusted upon the dash 12 in order to position the shield to the best advantage for the preferences of a particular driver.

There have been heretofore known glare shields having power operated means for raising and lowering the same between an operative and an inoperative position. However, to my knowledge, all such power operating means have been characterized by a relatively slow or appreciable period of time required to move the shields from a stored inoperative position to a fully extended operative position for protecting the driver against glare. An essential feature of this invention resides in the provision of operating means which shall overcome this difficulty and effect a substantial instantaneous movement of the glare shield into its operative position.

As shown in the drawings, the operating means for this invention consists of an electric solenoid indicated generally by the numeral 60 and which should be of any suitable design for the purpose, being supplied with electric current as by the conductors 62. The solenoid has the usual armature, not shown, provided with an armature rod 64 which is slidable axially of the solenoid core, this rod being apertured at its extremity as at 66 and being connected by a link 68 to the aperture 50 of the arm 48 of the endmost glare shield segment 42. The solenoid is releasably securely mounted in the casing 18 as by means of clamps or straps 70 which encircle the solenoid and which are secured as by fasteners 72 which may extend through elongated slots 74, see FIGURE 1, in the side wall 24 of the housing. The arrangement is such that the relative position of the solenoid may be varied or shifted within the housing by loosening the fasteners 72, in order to vary the limits of the range of movement of the solenoid rod 64 and thus of the blades or segments 42 of the glare shield connected thereto. It is contemplated that the stroke of the solenoid shall be such as to effect the desired amplitude of arcuate rotation or swinging movement of the glare shield blades 42, as desired. Obviously, as the solenoid is energized to move the solenoid rod 64 towards the left, as viewed in FIGURES 2 and 4, the arm 48 of the endmost glare shield blade 42 will be moved clockwise from its retracted position in FIGURE 4 to its fully extended position of FIGURE 2. This in turn will move all of the segments into the fan-shaped arrangement shown in FIGURES 1 and 2 thus providing an effective glare shield for the driver. The operation of the solenoid is substantially instantaneous, or at least has a negligible delay in its operation thus insuring a rapid raising of the glare shield into its operative position which renders the device ideally adapted for use in an emergency as when the driver is suddenly confronted with glaring headlights of an oncoming vehicle.

The control means for the solenoid may obviously be of various conventional types and may be located at any convenient place for easy access by the driver. In accordance with the embodiment illustrated, this control means consists of any conventional form of push button switch such as that shown at 76 in FIGURE 1 and which is mounted upon the end of the turn signal indicator lever 16. Thus, the control of the glare shield is instantly available to the driver as desired. Depressing the switch 76 actuates the solenoid thus raising the glare shield to its operative position. Release of the switch 76 permits gravity to return the glare shield to its stored position. Although gravity will require a greater length of time to return or retract the glare shield than is required by the solenoid to elevate or lift the same, this is an acceptable condition inasmuch as there is no requirement that the shield be instantly lowered after the emergency is over such as is presented by the emergency requirement for the use of the shield. Thus, considerably less wear is imposed upon the parts by permitting the shield to collapse normally under the influence of gravity in comparison with providing a more rapid return means.

It is within the purview of this invention to provide various optical properties for the translucent vanes, blades or segments of the glare shield. Thus, they may be of a material which is sufficiently tinted to remove glare. On the other hand, in some instances, they may be constructed of a polarized material so that they will be effective to reduce glare when they are in their substantially fully extended position. Moreover, any desired amount of overlap of the glare shield segments is possible, it being merely necessary to provide the requisite number of segments and the requisite width for each segment to obtain the desired result.

For convenience of illustration there has been shown but a single pivot hole by which the individual segments or blades 42 are pivoted upon the sleeve 44 of the pivot means. However, it is specifically intended that this invention shall cover the provision of two or more such apertures spaced along the length of the blades 42 in order to enable an adjustment of the vertical height of the range of movement of the glare shield segments so that the area which is shielded thereby can be respectively raised or lowered with respect to the requirements of an individual driver.

There is thus provided means to vary the actual area covered by the segments both by varying the length of the segment extremities from their pivot point as well as by varying the circumferential displacement of one segment with respect to another by means of the flexible cable arrangement 52; and also to vary the position of the area swept by the segments by adjustment of the solenoid 60 in its clamps 70.

The previously mentioned conductors 62 may extend through suitable grommeted outlet means 80 from the interior of the casing 18, through the dash 12 and below the latter whereby they may be connected to a suitable source of supply of electric current for the vehicle and also may be connected as shown by the dotted line showing of the cables at 82 in FIGURE 1 to the control button 76.

In the embodiment illustrated in FIGURES 1–5, a preferred form of the invention is indicated which is particularly adaptable for use with existing motor vehicles as an attachment thereto inasmuch as it requires a minimum amount of cutting of or alteration of vehicle structure. However, where the device is to be built into a vehicle during the construction or fabrication of the same, the form illustrated in FIGURES 6 and 7 may be in some instances preferable. In this form of the invention and its application, the numeral 10 designates the windshield and the numeral 12 the dash thereof. However, in this form the operating mechanism and the mounting of the guide of the glare shield are both positioned below the top surface of the dash in a concealed and unobtrusive location, with the glare shield itself, indicated by the numeral 90, being movable from a retracted position below the top of the dash to an elevated position extending through the dash. In this embodiment the glare shield preferably consists of a single sheet of material 92 which may have any of the optical properties discussed in connection with the preceding embodiment. As shown in full lines in FIGURE 6, the shield 92 is of slightly greater extent than a quadrant, the angular or circumferential extent of this shield being sufficient to give the desired area of glare protection for the driver of the vehicle. At the junction of its two regularly disposed side edges the glare shield 92 has an integral depending or projecting lug or tab 94 by which it is mounted upon a pivotal fastener 96 carried by a depending bracket 98. It will be observed that the mounting bracket 98 depends beneath the dash upper wall and adjacent a slot 100 therein. The slot may be either an opening already provided for other purposes in the dash, or may be especially constructed in order to permit the egress of the glare shield 92 therethrough. The opposite wall of the slot has a downturned flange 102 with an outwardly flaring extremity 104 to provide a guide means to insure easy passage of the blade 92.

A further bracket 106 is secured to a lower portion of the dash 108 as for example by the fasteners 110, and mounts thereon as by the clamps 112 and fasteners 114 the solenoid 116. This form of the invention is operated in the same manner as that form in the preceding embodiment, as by conductors 118 from any suitable source of electric current, and has its solenoid rod 120 connected to either an integral projecting arm on the glare shield blade 92 or to an operating arm 122 which may be connected in any suitable manner to the blade 92 at its projecting portion 94 or to the pivot 96 which thus may be fixedly secured to the blade and may be rotatable in the bracket 98. In either event, in the operation of this form of the invention the actuation of the solenoid will cause the blade to lift from its dotted line lowered position in FIGURE 6 to its fully raised position shown in full lines in FIGURE 6 or in FIGURE 7. Again, the influence and the position of the center of gravity is relied upon to return or retract the blade to its lowered position when the same is no longer required.

As in the preceding embodiment, adjustment of the blade both as to the vertical height of its area of shielding or as to its transverse displacement in the car in order to shift this shield area towards the right or left to accommodate the driver can be effected by appropriate positioning of a series of apertures in the bracket 108 in which the fastener 96 may be selectively positioned to effect the desired adjustment of the position of the blade. Similarly, the solenoid 116 may be adjusted by loosening the clamps and shifting the solenoid in the clamps in order to affect the amplitude of the swinging movement of the blade.

It will be observed that in this form of the invention the device is much more compactly housed as all of the mechanism is now disposed below the top surface of the dash in contrast to the preceding embodiment where it is housed in a case 18 mounted upon the top of the dash; and the thickness of the glare shield is reduced since a single sheet of material for the blade 92 is substituted for the plural sheets of the multiple blades or vanes 42 disposed in side by side relation in the preceding embodiment.

In some instances, where an even simpler construction of the device is desired, the power operating means for the fan can be omitted and a suitable manually or foot actuated operating means would then be substituted therefor. Such a means might for instance consist of a suitable linkage or cable system or other mechanism.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A glare reducing device for vehicle drivers comprising a glare shield, mounting means for pivotally supporting said shield for vertical swinging movement adjacent a vehicle windshield, said mounting means positioning said shield for movement between a retracted inoperative position and an extended operative position disposed in the line of vision of a vehicle driver and the windshield, operating means including a solenoid connected to said shield for relatively instantaneous movement of the latter from its retracted position to its extended position, said shield comprising a single quadrant-shaped blade, said mounting means and said operating means being disposed below the top of the vehicle dash.

2. The combination of claim 1 wherein said solenoid is mounted adjustably upon a support bracket, said mounting means including a pivot bracket, said brackets being both mounted upon the vehicle dash.

3. The combination of claim 1 wherein said blade has an arm projecting from said blade and upon the opposite side of said blade mounting means from said blade, a link connecting said solenoid to said arm.

4. The combination of claim 3 including a support bracket mounted upon the vehicle dash, means securing said solenoid upon said support bracket for adjustable positioning towards and from said mounting means whereby to adjustably vary the area upon the windshield traversed by said blade.

5. The combination of claim 1 wherein said mounting means includes a pivot, said blade being so disposed upon said pivot that the center of gravity of the blade will urge the blade into its retracted position.

References Cited in the file of this patent

UNITED STATES PATENTS

| | | |
|---|---|---|
| 1,522,692 | Moore | Jan. 13, 1925 |
| 1,617,981 | Allen | Feb. 15, 1927 |
| 2,279,011 | Nicholson | Apr. 7, 1942 |
| 2,509,601 | Fuller | May 30, 1950 |

FOREIGN PATENTS

| | | |
|---|---|---|
| 62,430 | France | Jan. 19, 1955 |
| | (Addition to 1,046,148) | |
| 567,967 | Germany | Jan. 12, 1933 |
| 336,889 | Great Britain | Oct. 23, 1930 |